US011578698B2

(12) United States Patent
Stecher et al.

(10) Patent No.: US 11,578,698 B2
(45) Date of Patent: Feb. 14, 2023

(54) FOUNDATION FOR A WINDMILL (71) Applicant: HOLCIM TECHNOLOGY LTD., Zug (CH)

(72) Inventors: Arne Stecher, Holderbank (CH); Christian Schuldt, Holderbank (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 0 days.

(21) Appl. No.: 17/259,875

(22) PCT Filed: Jul. 9, 2019

(86) PCT No.: PCT/IB2019/055823
§ 371 (c)(1),
(2) Date: Jan. 12, 2021

(87) PCT Pub. No.: WO2020/012346
PCT Pub. Date: Jan. 16, 2020

(65) Prior Publication Data
US 2021/0222677 A1    Jul. 22, 2021

(30) Foreign Application Priority Data
Jul. 13, 2018  (AT) ................................. A 208/2018

(51) Int. Cl.
*F03D 13/20*      (2016.01)
*E02D 27/42*      (2006.01)
(52) U.S. Cl.
CPC ........... *F03D 13/22* (2016.05); *E02D 27/425* (2013.01)

(58) Field of Classification Search
CPC ....... F01D 13/22; F01D 13/20; E02D 27/425; E02D 27/42; E02D 2200/1664; E02D 2200/1621; E04H 12/34; E04H 12/342
See application file for complete search history.

(56) References Cited

U.S. PATENT DOCUMENTS

| 8,695,297 B2 * | 4/2014 | Knisel ..................... F03D 13/22 |
| | | 52/294 |
| 10,676,889 B2 * | 6/2020 | Corella ................. E02D 27/425 |
| 10,876,269 B2 * | 12/2020 | Schuldt ................... E02D 27/42 |

(Continued)

FOREIGN PATENT DOCUMENTS

| AT | 517959 B1 * | 6/2017 | ............. F03D 13/22 |
| DE | 102010012094 B3 * | 11/2011 | ......... E02B 17/0004 |

(Continued)

OTHER PUBLICATIONS

International Search Report as issued in International Patent Application No. PCT/IB2019/055823, dated Oct. 22, 2019.

*Primary Examiner* — Theodore V Adamos
(74) *Attorney, Agent, or Firm* — Pillsbury Winthrop Shaw Pittman LLP (57) ABSTRACT

A foundation for a windmill with a base ring composed of prefabricated concrete elements and divided into several ring sections and support elements extending radially outward from the base ring, wherein the base ring is supported on the support elements by primary strut ribs and wherein a mounting ring, which is divided into several ring sections and composed of prefabricated concrete elements, is placed on the base ring and connected to the base ring, wherein the construction ring is supported by secondary strut ribs on the primary strut ribs.

22 Claims, 3 Drawing Sheets

(56) References Cited

U.S. PATENT DOCUMENTS

| | | | |
|---|---|---|---|
| 10,968,592 B2 * | 4/2021 | Schuldt | F03D 13/22 |
| 2012/0023860 A1 * | 2/2012 | Voss | F03D 13/20 52/651.09 |
| 2012/0167499 A1 * | 7/2012 | Knisel | F03D 13/22 52/231 |

FOREIGN PATENT DOCUMENTS

| | | | | |
|---|---|---|---|---|
| DE | 102019126629 A1 * | 4/2021 | | E02D 27/425 |
| EP | 3 153 627 A1 | 4/2017 | | |
| ES | 2361358 A1 | 6/2011 | | |
| GB | 2 536 228 A | 9/2016 | | |
| WO | WO 2004/101898 A2 | 11/2004 | | |
| WO | WO 2014/060650 A2 | 4/2014 | | |
| WO | WO 2015/048147 A1 | 4/2015 | | |
| WO | WO 2018/055444 A1 | 3/2018 | | |
| WO | WO 2018/065655 A1 | 4/2018 | | |
| WO | WO-2018065655 A1 * | 4/2018 | | E02D 27/425 |

* cited by examiner

Fig. 1

Fig. 3

FOUNDATION FOR A WINDMILL

CROSS-REFERENCE TO RELATED APPLICATIONS

This application is the U.S. National Stage of International Application Serial No. PCT/IB2019/055823, filed Jul. 9, 2019, which in turn claims priority to Austrian Application No. A 208/2018, filed Jul. 13, 2018. The contents of all of these applications are incorporated herein by reference in their entirety.

The invention relates to a foundation for a windmill with a base ring composed of prefabricated concrete elements and divided into several ring sections and support elements extending radially outward from the base ring, wherein the base ring is supported on the support elements by primary strut ribs and wherein a mounting ring, which is divided into several ring sections and composed of prefabricated concrete elements, is placed on the base ring and connected to the base ring.

The invention also relates to a windmill with a windmill tower comprising a rotor, the windmill tower being mounted on a foundation. The invention also relates to a modular system for producing a foundation for a windmill.

In WO 2004/101898 A2 a foundation for a windmill is disclosed. As described there, a high level of manual and administrative effort is required for the manufacture of the foundation for onshore windmills, and the manufacture is very time-consuming. In view of the increasing dimensions of modern windmills, the foundation is exposed to very high loads and must be dimensioned accordingly. Today's windmills have a tower with a height of up to 150 m and generate up to 6 MW. In the majority of cases, the tower or mast of windmill is made of reinforced concrete and is built using prefabricated concrete elements. Alternatively, the windmill tower also be formed from a steel structure.

Prior to the introduction of foundations made of prefabricated concrete elements, the foundations for windmills were essentially created by excavating an excavation, introducing a granular substructure, erecting a foundation component, performing the necessary formwork and reinforcement work and then filling the excavation with in-situ concrete, wherein the concrete was transported to the work site as ready-mixed concrete by truck mixers and poured into the excavation. The central foundation component usually has a hollow cylindrical configuration and has generally been prefabricated and transported as a unit to the respective assembly location.

The production of a windmill foundation using in-situ concrete is associated with a number of disadvantages. It requires complex logistics for planning the manufacturing activities at the construction site, and it involves time-consuming and costly operations at the construction site with regard to the erection of the formwork and the reinforcement structure, as well as the transport and pouring of the concrete. This is especially true given that more than 1000 m³ of concrete may be required for large foundations.

In order to improve the construction process of a foundation, it has already been proposed in WO 2004/101898 A2 to build the foundation using prefabricated concrete elements. Such concrete elements are manufactured in a precast concrete plant and transported to the work site, where they are brought into position using a crane and then connected together. In this way, the duration of the construction process on the job site can be reduced considerably. When connected to one another, the prefabricated concrete elements form a foundation with a central annular pedestal and several support elements, each of which protrudes radially outward from the pedestal. The pedestal can have a circular or polygonal cross section. Each prefabricated concrete element forms one of the support elements and an associated ring section of the pedestal. The ring sections of the pedestal connected to one another by screwed flanges. As described in WO 2004/101898 A2, the prefabricated concrete elements can be steel-reinforced. After the foundation has been formed, the tower or mast of the windmill is erected on the pedestal and fastened to the pedestal with anchor bolts.

By using prefabricated concrete elements, production can take place in a controlled environment so that the quality of the hardened concrete can be improved. From a financial point of view, the molds used in a prefabrication plant can be reused many times before they have to be replaced, so the cost of the mold or casing per unit is lower than if it is made with in-situ concrete, which every time requires the erection of a specific formwork. The formwork can be used several times, but has to be transported from place to place and cleaned accordingly.

Wind turbines are exposed to loads and stresses of a specific nature that have to be absorbed by the foundation. The wind itself acts in an unpredictable and variable way. On the other hand, with ever larger systems, dynamic load components act on the structure as a result of vibrations and resonances. Furthermore, towers with a height of 100 meters and more transfer considerable eccentric loads to the foundation as a result of the tilting moment that occurs. The concrete of the foundation has to withstand a compression that occurs in the compressed zone, and the reinforcement structure of the concrete has to absorb the tensile forces in the opposite part of the foundation, because the concrete itself has a relatively low tensile strength. Foundations made of prefabricated reinforced concrete elements have the advantage that the performance and quality of the concrete, as well as the quality of the production, especially the post-processing and hardening process, are higher, so that there is a lower risk of cracking and a higher resistance to dynamic and static loads. This is especially true because the hardening of the concrete takes place under controllable conditions and therefore there is no risk related to weather conditions on the construction site.

In general, it is desirable to mount the tower or mast of the windmill directly on the foundation. The attachment of the tower to the foundation is not standardized, however, but must be adapted to the specific conditions of the respective windmill construction. Windmills vary in the dimensions and shape of the tower, in the material of the tower (steel or concrete) and in the type of fastening that is provided (e.g. anchor bolts or rope bracing). It is therefore necessary to adapt the foundation to these circumstances, which in the case of precast concrete foundations is disadvantageous in that standardized series production of such foundations is not possible.

Another disadvantage of foundations composed of precast concrete elements is that the concrete elements have to be transported from the factory to the installation site of the windmill. The general endeavor to minimize the number of precast concrete parts that make up the foundation has resulted in large and bulky concrete elements that are particularly challenging to transport. In order to enable transport with generally available road transport vehicles, however, maximum transport dimensions must be observed, which the component to be transported must not exceed.

In this regard, WO 2018/055444 A1 proposes a foundation for a windmill in which the pedestal of the foundation is divided in the vertical direction into a lower base ring section and an upper adapter ring section, each of which is composed of prefabricated concrete elements. As a result, the concrete elements of the base ring section can always be designed in the same way without having to go into manufacturer-specific adaptations for the tower area. This invention made it possible to mass-produce the concrete elements forming the base ring section. In the foundation according to WO 2018/055444 A1, the structural adaptations to the tower are provided by the adapter ring section. The adapter ring section establishes the force optimal connection between the precast foundation, namely the base ring section, and the windmill tower and thus leads to an improved standardization of the precast foundation.

In the windmill business it is a well-known fact that even a slight increase in height of the positioning of the rotor of a windmill brings about a significant increase in the energy yield of the windmill in question. The investment costs for the higher positioning of the rotor are often amortized over the service life, so that operators of windmills always strive to be able to erect the highest possible masts for the rotors. At the same time, however, inexpensive prefabricated masts that are available in certain height increments should continue to be used. When using such masts, however, the height of the positioning of the rotor often remains below the maximum height approved for a windmill project. Using the next longer standardized mast would, however, lead to the approved construction height being exceeded.

The invention is therefore based on the object of further developing a foundation of the type mentioned at the outset such that a slight increase in the positioning of the rotor in the wind can take place without having to do this by choosing a significantly higher mast height.

To achieve this object, a foundation of the type mentioned at the outset is developed according to the invention in such a way that the mounting ring is supported on the primary strut ribs by secondary strut ribs. Because the mounting ring with its secondary strut ribs is supported on the primary strut ribs that extend outward from the base ring, the mounting ring can be designed a little higher without having to worry about insufficient support against buckling loads. The bracing of the mounting ring can be led to the upper end of the mounting ring, so that even unusually high foundations are safely supported. Starting from a base level for the support of the foundation, the mast can therefore be raised somewhat with a correspondingly higher mounting ring, so that the desired higher positioning of the rotor of a windmill is achieved. The maximum permissible construction height can therefore also be achieved if a precast mast is significantly too short compared to the approved height, but a longer prefabricated mast would exceed the approved height. The present invention thus makes it possible to use prefabricated parts, in particular prefabricated concrete parts, to build inexpensive and flexible wind turbines that are optimized in terms of their height, which increases the energy yield and thus the profitability of the windmill.

In addition to the structural adaptations required by the tower, the design of the mounting ring can, if desired, take into account other functions. For example, the mounting ring can have an entrance, such as a door opening, into the tower. Furthermore, the mounting ring can be provided with prefabricated fastening points for receiving grid connection cables and/or a power input system or can have a prefabricated support for electrical installations. Furthermore, the mounting ring can comprise stairs or structural preparations for elevators that are arranged inside the space delimited by the mounting ring.

Another advantage of the design according to the invention results from the fact that the vertical division of the foundation into a base ring and a mounting ring leads to a reduction in the component height of the prefabricated concrete elements, so that compliance with a specified maximum transport height of 4.0 m, for example, is made possible.

A ring section of the base ring is preferably designed in one piece with at least one support element extending radially outward from the circumferential section of the base ring and with a primary strut rib, each as a prefabricated concrete element. According to this preferred embodiment of the present invention, such a prefabricated concrete element is produced by casting and obtained directly from the casting mold. This represents a simplification of the manufacturing process compared to a process in which several concrete parts have to be put together.

According to a preferred embodiment of the present invention, a ring section of the mounting ring with at least one secondary reinforcing rib is designed in one piece as a prefabricated concrete element, which brings the same advantages that have just been mentioned in connection with the base ring.

The prefabricated concrete elements thus preferably each have a ring segment-like inner ring section, wherein ring sections of all the concrete elements forming the base ring and the mounting ring are forming a closed ring-shaped structure in their juxtaposed position, which encloses an inner cavity of the foundation. The prefabricated concrete elements furthermore preferably each have a radially outer section which, in the case of the elements forming the base ring, forms the support elements and the primary strut ribs and in the case of the mounting ring forms the secondary strut ribs.

The invention is preferably developed in such a way that a prefabricated concrete element of the base ring comprises at least two support elements extending radially outward from the circumferential section of the base ring, each with a primary strut rib. Such a one-piece circumferential section of the foundation according to the invention can thus describe a quarter circle, for example, and have the corresponding number of support elements with primary strut ribs. If the finished foundation is to have eight support elements, for example, a one-piece circumferential section of the base, which describes a quarter circle, has two support elements with correspondingly two primary strut ribs.

Analogously to this, the present invention can preferably be further developed in such a way that a prefabricated concrete element of the mounting ring comprises at least two secondary reinforcing ribs for bracing against a primary strut rib of the base ring. Such a one-piece circumferential section of the foundation according to the invention can thus describe, for example, a quarter circle and have the corresponding number of secondary strut ribs. For example, if the finished foundation is to have eight support elements, a one-piece circumferential section of the structure, which describes a quarter circle, has two secondary strut ribs.

The foundation according to the invention is advantageously developed in such a way that the base ring and the mounting ring have different circumferential pitches, i.e. the circumferential extension of the ring sections of the base ring differs from the circumferential extension of the ring sections of the mounting ring. This measure ensures that the vertical dividing surfaces of the ring sections of the base ring and the mounting ring are offset from one another, regardless of whether care is taken when assembling the foundation from the prefabricated concrete parts, and thus a certain basic stability of the foundation according to the invention is reliably given.

The present invention is preferably developed in such a way that connecting elements, such as screw connections, are provided for the preferably releasable connection of the base ring and the primary strut ribs to the mounting ring and the secondary strut ribs. The mounting ring is preferably connected to the base ring from above with the aid of said connecting elements. The connecting means are formed, for example, by screw bolts which are screwed into preferably vertically extending screw holes which are preferably formed in horizontal flange elements of the respective prefabricated concrete element. Alternatively, the screw bolts can be arranged so that they penetrate through bores of both the base ring and the mounting ring and clamp the base ring and the mounting ring together by attaching screw nuts at the opposite ends.

Another preferred embodiment of the invention provides that the mounting ring comprises a horizontal platform for a windmill tower and anchoring means for anchoring the windmill tower on the mounting ring, the anchoring means preferably comprising anchor bolts and/or cable lead throughs for tension cables. The anchor bolts are usually intended for fastening a tower designed as a steel structure. The tension cables are usually intended for the fastening of concrete towers, both solid concrete towers and hybrid towers.

The connecting elements for connecting the base ring and the primary strut ribs to the mounting ring and the secondary strut ribs are preferably arranged radially outside of the anchoring means for anchoring the windmill tower on the mounting ring. Alternatively, the connecting elements provided for connecting the mounting ring to the base ring, in particular screw bolts, can also be used for anchoring the windmill tower to the annular pedestal, which consists of the base ring and the mounting ring.

The prefabricated concrete elements are preferably made of reinforced concrete which has a reinforcement structure, in particular reinforcement elements, profiles, rods or wires, which are embedded in the prefabricated concrete elements and/or which are designed as tensioning elements for tensioning the prefabricated concrete elements together to form prestressed concrete elements.

In contrast to foundations made of in-situ concrete, foundations made of precast concrete elements do not provide a monolithic structure without additional measures, so that technical solutions for securely connecting the prefabricated concrete elements to one another to imitate a monolithic structure are sought. In order to achieve that the foundation according to the invention behaves similarly to a monolithic foundation in order to withstand high static and dynamic loads, a preferred embodiment provides that a connection structure is provided which holds the prefabricated concrete elements together and is preferably coupled to the reinforcement structure. The connection structure can be of any type suitable for rigidly holding the prefabricated concrete elements together to form a monolithic structure. The connection structure differs from the reinforcement structure and is therefore preferably not embedded in the prefabricated concrete elements. The connection structure is preferably coupled to the reinforcement structure, which enables an uninterrupted load path between the reinforcement structures, so that the forces introduced into the foundation are effectively distributed. In the context of the invention, the coupling of the connection structure and the reinforcement structure means that the forces acting on the reinforcement structure are transmitted to the connection structure without concrete being placed in between, and vice versa. Accordingly, the connection structure and the reinforcement structure can be connected to one another directly or via a rigid connecting element other than concrete. Alternatively, the connection structure and the reinforcement structure can also be coupled with the interposition of concrete material.

The reinforcement structure preferably includes reinforcement rods made of steel or a similar rigid material. The reinforcing rods preferably extend in the longitudinal direction of the strut ribs. Additional reinforcement rods can extend perpendicularly or obliquely to the reinforcement rods, which extend in the longitudinal direction of the strut ribs. Additional reinforcing rods/profiles can also be arranged in the base ring and in the mounting ring and extend in the axial direction thereof. The elongated reinforcing rods can preferably extend in the radial direction to the center of the foundation according to the invention, wherein the elongated reinforcing rods may either be arranged in a horizontal plane or may extend obliquely to the horizontal plane, in particular to the base ring and the mounting ring. In the latter case, the reinforcing rods are essentially aligned with the load path with respect to the forces that are derived radially outward from the base ring and the mounting ring.

The connection structure preferably has several rigid elongated connecting elements, in particular steel profiles or rods, which each connect the prefabricated concrete elements of a pair of oppositely arranged prefabricated concrete elements with one another in such a way that a cavity is crossed that is encircled by the base ring and the mounting ring. The elongate connecting elements of the connection structure are coupled to the reinforcement structure, in particular with the reinforcement rods, preferably with the reinforcement rods which extend in the longitudinal direction of the strut ribs. In this way, the reinforcing rods embedded in oppositely arranged prefabricated concrete elements are connected to one another by the elongate connecting elements of the connection structure, a load transmission path being formed between the reinforcement structure of the oppositely arranged prefabricated concrete elements. As a result, the tensile load exerted on the foundation as a result of a bending moment of the tower is not only taken up by the reinforcement structure located on one side of the foundation, but also transferred to the reinforcement structure arranged on the opposite side of the foundation.

According to a preferred embodiment of the invention, each pair of oppositely arranged prefabricated concrete elements is connected to one of the rigid elongate connecting elements. In this way, several elongated connecting elements, in particular steel rods or profiles, traverse the cavity encircled by the base ring and the mounting ring. Because these transverse elongated connecting elements are all diametrically arranged, they meet in the center of the base ring of the foundation according to the invention, consisting of the base ring and the mounting ring, so that a symmetrical arrangement is achieved which ensures an optimal distribution of the forces within the entire foundation.

The elongated reinforcement elements can traverse the base ring or the mounting ring in a horizontal plane. Preferably, however, it is provided that a pair of oppositely arranged prefabricated concrete elements each comprise a ring section of the base ring with at least one support element extending radially outward from the ring section of the base ring and with a primary strut rib as well as a ring section of the mounting ring with at least one secondary strut rib.

In this context, it is advantageous if the rigid elongate connecting elements are connected to one another at their section, which is arranged on the central axis of the base ring and the mounting ring. In this way, a center point is provided in the axis of symmetry of the foundation, which enables the load to be distributed in different directions.

With regard to the coupling between the reinforcement structure and the connection structure, a preferred embodiment provides that the rigid elongated connecting elements of the connecting structure and the reinforcement structure, in particular the reinforcing rods, are connected to one another by a jacket which is attached to an inner surface of the base ring and the mounting ring. The jacket may consist of a sheet steel housing attached to the inner surface of the base ring and the mounting ring. In the case of a base ring and mounting ring in the form of hollow cylinders, the jacket can be designed as a cylindrical jacket which is arranged on the inner cylindrical surface of the base ring and the mounting ring. The jacket serves to direct the load path from the reinforcement structure to the connection structure and vice versa. This is achieved by rigidly connecting both the reinforcing rods/profiles of the reinforcement structure and the reinforcement elements of the connection structure to the jacket.

In this context, a preferred embodiment provides that the reinforcement elements of the reinforcement structure are attached to the jacket by welding and/or screw connections. This can advantageously be achieved by arranging the reinforcing rods of the reinforcement structure so that they protrude inwardly from the prefabricated concrete elements and preferably penetrate into openings provided in the jacket. In this case, welding can take place on the inside of the jacket. Alternatively, welding can be done on the outside of the jacket.

Furthermore, the connection structure can be attached to the jacket by welding or a screw connection.

Alternatively, the connection structure can be fastened by welding or a screw connection to connection pieces which are integrated into the prefabricated concrete elements, in particular cast, and are coupled to the reinforcement structure.

The cavity within the base ring and the mounting ring can be used for various purposes, for example as storage space or for carrying out maintenance work, and it can therefore be provided with stairs, platforms and the like. Furthermore, the cavity can also be used for the installation, access to and maintenance of post-tensioning cables, the tensioning cables being arranged to stabilize the tower of the windmill.

The support elements of the prefabricated concrete elements can have a rectangular shape. Alternatively, the support elements can widen in the horizontal direction with increasing distance from the center of the foundation.

In order to close the cavity within the annular pedestal consisting of the base ring and the mounting ring at its bottom, a preferred embodiment of the present invention provides that the support elements have an edge section which protrudes inward into the cavity encircled by the base ring. In particular, the edge sections of all prefabricated concrete elements together form a circumferential, in particular circular edge, which circumferentially supports a central base plate, which is arranged on the floor of the annular pedestal or the base ring.

According to a further preferred embodiment of the invention, the prefabricated concrete elements are tightened to one another by at least one tensioning cable which is arranged in a circumferential, in particular circular passage which is formed in the base ring and in the mounting ring. Such cables have the function of a connection structure which, however, is not coupled, as described above, to the reinforcement structure embedded in the prefabricated concrete elements.

When the prefabricated concrete elements are tightened together, the side surfaces of adjacent peripheral sections of the base ring and the mounting ring are pressed against one another. For precise alignment of the adjacent circumferential sections with one another, the side surfaces can have form-fitting elements in the manner of a tongue and groove arrangement which cooperate with one another in order to ensure the relative position of the segments.

The installation of the prefabricated concrete elements at the work site is considerably simplified if, according to a preferred embodiment, adjacent prefabricated concrete elements are circumferentially spaced from one another in their sections that protrude outward from the mounting ring. In particular, the support elements have such a width dimension that the support elements of adjacent prefabricated concrete elements do not touch one another. In this way, the manufacturing tolerances in the manufacture of the prefabricated concrete elements can be achieved.

The concrete used for the manufacture of the precast concrete elements can be of any type that is also typically used for the pouring of concrete at the point of use. In addition to aggregates and water, concrete contains cement as a hydraulic binder.

Fiber-reinforced concrete can also be used to make the prefabricated concrete elements. The fibers can be made from any fiber material that helps increase the structural integrity, particularly strength, impact resistance and/or durability, of the resulting concrete structure. Fiber-reinforced concrete contains short discrete reinforcement fibers that are evenly distributed and randomly oriented.

The reinforcing fibers are preferably carbon fibers, synthetic fibers and, in particular, polypropylene fibers. Alternatively, the reinforcing fibers can be steel fibers, glass fibers or natural fibers. The use of HPC (High Performance Concrete) and UHPC (Ultra High Performance Concrete) is also possible. These types of concrete are extremely fine binders with special, extremely fine aggregates and corresponding additives and are to be regarded as advantageous due to their relatively low weight.

The windmill according to the invention with a windmill tower comprising a rotor is mounted on a foundation as described above and can therefore have an optimized overall height, even if precast concrete parts are to be used for reasons of cost. The foundation is taller compared to prior art foundations and yet properly supported.

The modular system according to the invention for producing a foundation for a windmill as described above has a base ring composed of prefabricated concrete elements, divided into several ring sections, and support elements extending radially outward from the base ring, the base ring being supported on the support elements by primary strut ribs. A mounting ring, which is divided into several ring sections and composed of prefabricated concrete elements, can be placed on the base ring and connected to the base ring, the mounting ring being supported by secondary strut ribs on the primary strut ribs of the base ring and the system comprising at least two different versions of a mounting ring, which can be placed on the base ring. The modular system, with its at least two different versions of the mounting ring, allows the mounting ring to be adapted to the conditions of the installation situation of each individual windmill in a wind farm, in order to achieve an optimal result when using precast concrete parts.

The at least two different versions of the mounting ring preferably differ from one another in their height in order to maximize the energy yield and thus the profitability of the windmill when the overall height of the windmill is maximized with respect to the permitted or approved height.

As an alternative or in addition, the at least two different versions of the mounting ring differ in the anchoring means for anchoring the windmill tower on the mounting ring, in particular in the type, number or geometry of the anchoring means. In this context, it is conceivable, for example, that a first embodiment of the mounting ring comprises anchoring bolts for anchoring the windmill tower and a second embodiment of the mounting ring includes cable ducts for tensioning cables for bracing the windmill tower, as corresponds to a preferred embodiment of the present invention. The anchor bolts are usually intended for fastening a tower designed as a steel structure. The cable lead throughs are usually intended for the attachment of concrete towers.

Figure 1:
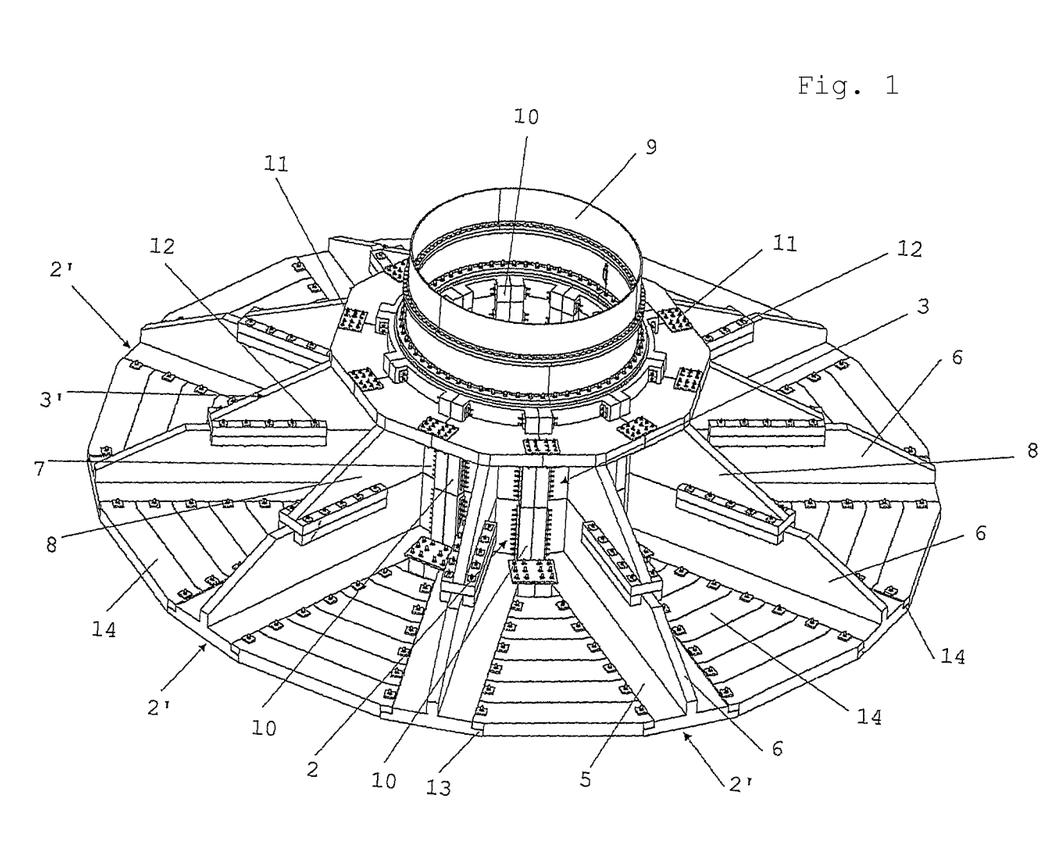
Figure 2:
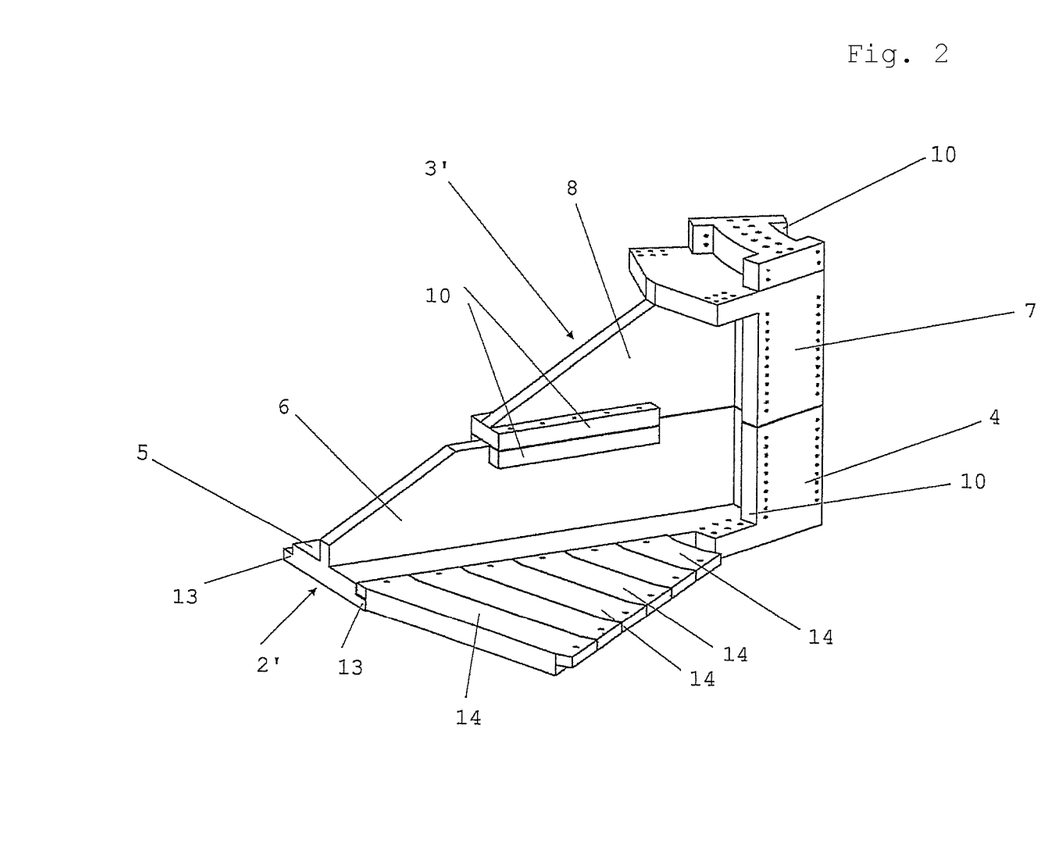
Figure 3:
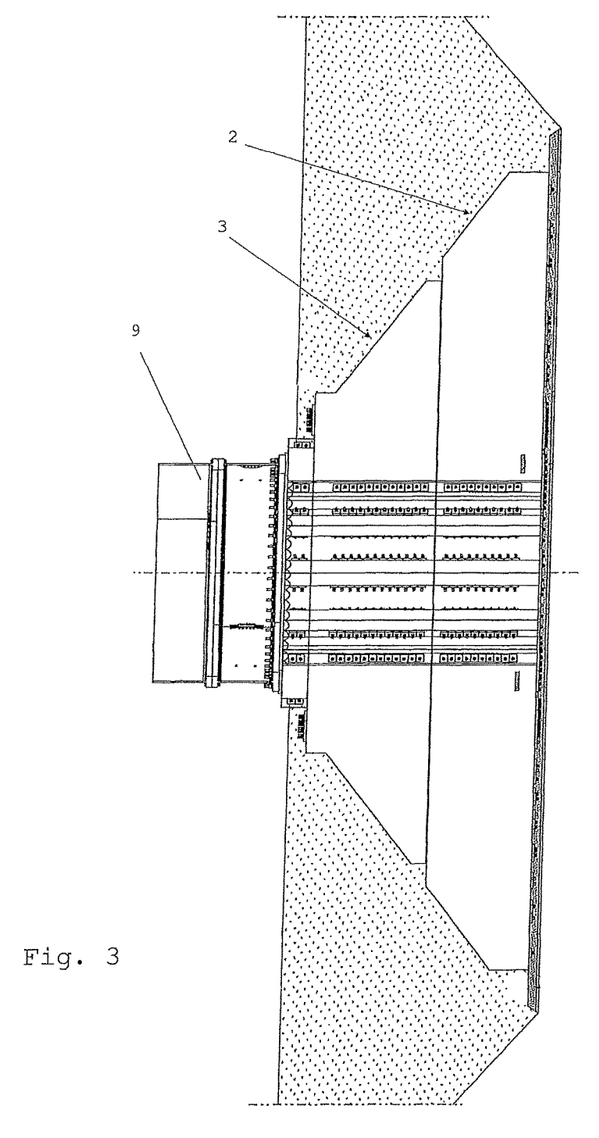

The invention is explained in more detail below with reference to an embodiment shown in the drawing. Therein, FIG. 1 is a perspective view of the foundation according to the invention, FIG. 2 is a perspective view of a peripheral portion of the foundation according to the invention and FIG. 3 shows a sectional side view of the foundation according to the invention In FIG. 1, the foundation according to the invention is designated generally by the reference number 1. The foundation 1 essentially consists of a base ring 2 and a mounting ring 3, both the base ring 2 and the mounting ring 3 being divided into a plurality of ring sections 4 and 7 and being composed of these. A circumferential section 2' of the base has a circular segment-shaped ring section 4 and a support element 5. The base ring 2 is supported as a whole by primary strut ribs 6 on the support elements 5. A circumferential section 3' of the mounting ring 3 has a circular segment-shaped ring section 7 and secondary strut ribs 8 (FIG. 2) which are supported on the primary strut ribs 6 on the base ring 2. The mounting ring 3 is thus supported as a whole by the secondary strut ribs 8 on the primary strut ribs 6 of the base ring 2 and can therefore be designed with a relatively large height extension in order to slightly raise the mast adapter 9 of a windmill. The connection of the circumferential sections 2' and 3' of the base ring 2 and the mounting ring 3, which are manufactured as prefabricated, one-piece concrete parts, takes place by means of flanges 10 and screw plates 11, which are screwed with screw bolts 12. Between the support elements 5 of the base ring base plates 14 are inserted on corresponding projections 13 and also screwed.

In FIG. 2 it can now be seen even more clearly that a circumferential section 2' of the base essentially consists of a support element 5 and a ring section 4, the ring section 4 being supported on the support element 5 by a primary strut rib 6. The ring section 7 of the circumferential section 3' of the mounting ring 3 is supported according to the invention by the secondary strut rib 8 on the primary strut rib 6. The flanges for receiving the screw bolts, not shown in FIG. 2, are in turn denoted by the reference numeral 10. In the ring sections 4 and 7, a plurality of bores are made in the flanges 10, which are used to screw the respective ring sections 4 and 7 together.

In FIG. 3 it can be seen that the mounting ring 3 can have a height that exceeds the height of the base ring 2. The mast adapter 9 can thus be raised accordingly in order to be able to achieve the desired height of the positioning of a rotor.

The invention claimed is:

1. A foundation for a windmill comprising a base ring composed of prefabricated concrete elements and divided into a plurality of individual ring segments, which together form the base ring, and support elements extending radially outward from the base ring, wherein the base ring is supported on the support elements by primary strut ribs and a mounting ring, which is divided into a plurality of individual ring segments, which together form the mounting ring, wherein the mounting ring is composed of prefabricated concrete elements, and is placed on the base ring and connected to the base ring, wherein the mounting ring is supported by secondary strut ribs on the primary strut ribs, and a bottom portion of at least one of the secondary strut ribs comprises a flange extending outwardly from the respective secondary strut rib and is connected along said flange to a respective one of the primary strut ribs, wherein a ring segment of the base ring is integrally formed with one support element extending radially outward from the ring segment of the base ring and with a primary strut rib as a prefabricated concrete element, and a ring segment of the mounting ring is integrally formed with one secondary strut rib as a prefabricated concrete element.

2. The foundation according to claim 1, wherein a prefabricated concrete element of the base ring comprises at least two support elements extending radially outwardly from the ring segment of the base ring, each with a primary strut rib.

3. The foundation according to claim 1, wherein a prefabricated concrete element of the mounting ring comprises at least two secondary strut ribs for bracing against one primary strut rib.

4. The foundation according to claim 1, wherein the base ring and the mounting ring have a different circumferential pitch.

5. The foundation according to claim 1, wherein connecting elements are provided for the releasable connection of the base ring and the primary strut ribs with the mounting ring and the secondary strut ribs.

6. The foundation according to claim 1, wherein the mounting ring comprises a horizontal platform for a windmill tower and anchoring means for anchoring the windmill tower on the mounting ring.

7. The foundation according to claim 6, wherein the connecting elements for the connection of the base ring and the primary strut ribs with the mounting ring and the secondary strut ribs are arranged radially outside of the anchoring means for anchoring the windmill tower on the mounting ring.

8. The foundation according to claim 1, wherein the prefabricated concrete elements consist of reinforced concrete which has a reinforcement structure.

9. The foundation according to claim 1, wherein a connection structure is provided which holds the prefabricated concrete elements together.

10. The foundation according to claim 9, wherein the connection structure has several rigid elongated connecting elements, which each connect the prefabricated concrete elements of a pair of oppositely arranged prefabricated concrete elements with one another in such a way that a cavity is crossed that is encircled by the base ring and the mounting ring.

11. The foundation according to claim 10, wherein each pair of oppositely arranged prefabricated concrete elements is connected to one of the rigid elongate connecting elements.

12. The foundation according to claim 10, wherein a pair of oppositely arranged prefabricated concrete elements each comprise a ring segment of the base ring with at least one support element extending radially outward from the ring segment of the base ring and with a primary strut rib as well as a ring segment of the mounting ring with at least one secondary strut rib.

13. The foundation according to claim 10, wherein the rigid elongate connecting elements of the connection structure and the reinforcement structure are interconnected by a jacket which is attached to an inner surface of the base ring and the mounting ring.

14. The foundation according to claim 13, wherein the reinforcement elements of the reinforcement structure are attached to the jacket by welding and/or screw connections.

15. The foundation according to claim 1, wherein said one of the primary strut ribs has an upper portion and said at least one of the secondary strut ribs rests on said one of the primary strut ribs so that said flange is positioned against said upper portion and a length of said flange is less than a length of said upper portion.

16. The foundation according to claim 1, wherein said one of the primary strut ribs includes a first flange arranged at a top portion of said one of the primary strut ribs, wherein the first flange and the flange of the at least one secondary strut ribs are positioned against each other when said at least one of the secondary strut ribs rests on said one of the primary strut ribs.

17. The foundation according to claim 1, wherein said one of the primary strut ribs includes two flanges arranged at a top portion of said one of the primary strut ribs and on opposite sides of said one of the primary strut ribs and said at least one of the secondary strut ribs includes said flange and a second flange arranged at said bottom portion and on opposite sides of said at least one of the secondary strut ribs, wherein the two flanges arranged at the top portion are positioned against the two flanges arranged at the bottom portion when said at least one of the secondary strut ribs rests on said one of the primary strut ribs.

18. A windmill with a windmill tower comprising a rotor, the windmill tower being mounted on a foundation according to claim 1.

19. A modular system for producing a foundation for a windmill according to claim 1, the modular system comprising a base ring which is divided into a plurality of individual ring segments and composed of prefabricated concrete elements, which together form the base ring, and with support elements extending radially outward from the base ring, wherein the base ring is supported on the support elements by primary strut ribs, and a mounting ring, which is divided into a plurality of individual ring segments which together form the mounting ring and is composed of prefabricated concrete elements, is configured to be placed on the base ring and is configured to be connected to the base ring, wherein the mounting ring is configured to be supported on the primary strut ribs of the base ring by means of secondary strut ribs, at least one secondary strut rib comprising a flange extending outwardly from a bottom portion of a respective secondary strut rib, the flange configured to be connected therealong to a respective one of the primary strut ribs, wherein a ring segment of the base ring is integrally formed with one support element extending radially outward from the ring segment of the base ring and with a primary strut rib as a prefabricated concrete element, a ring segment of the mounting ring is integrally formed with one secondary strut rib as a prefabricated concrete element, and wherein the system comprises at least two different versions of the mounting ring, that are configured to be placed on the base ring.

20. The modular system according to claim 19, wherein the at least two different versions of the mounting ring differ in height from one another.

21. The modular system according to claim 19, wherein the at least two different versions of the mounting ring differ in the anchoring means for anchoring the windmill tower on the mounting ring.

22. The modular system according to claim 19, wherein a first embodiment of the mounting ring comprises anchoring bolts for anchoring the windmill tower and a second embodiment of the mounting ring includes rope lead throughs for tensioning ropes for tensioning the windmill tower.

* * * * *